United States Patent
Kliesch et al.

(10) Patent No.: US 7,238,417 B2
(45) Date of Patent: *Jul. 3, 2007

(54) TRANSPARENT FILM MADE FROM PET AND PEN WITH UV PROTECTION, PROCESS FOR PRODUCING THE FILM, AND USE OF THE FILM IN PACKAGING WITH EXTENDED SHELF LIFE

(75) Inventors: Holger Kliesch, Mainz (DE); Ursula Murschall, Nierstein (DE); Thorsten Kiehne, Wiesbaden (DE); Gottfried Hilkert, Saulheim (DE); Bart Janssens, Wiesbaden (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/462,460

(22) Filed: Jun. 16, 2003

(65) Prior Publication Data

US 2003/0235702 A1     Dec. 25, 2003

(30) Foreign Application Priority Data

Jun. 20, 2002    (DE) ................................ 102 27 439

(51) Int. Cl.
| | |
|---|---|
| *B32B 27/08* | (2006.01) |
| *B32B 27/20* | (2006.01) |
| *B32B 27/32* | (2006.01) |
| *B32B 27/34* | (2006.01) |
| *B32B 27/36* | (2006.01) |

(52) U.S. Cl. ....................... 428/323; 428/216; 428/337; 428/339; 428/475.2; 428/480; 428/483; 428/910; 528/302; 528/305; 528/308; 528/308.6; 528/308.7; 264/288.4; 264/290.2

(58) Field of Classification Search ................... None
See application file for complete search history.

(56) References Cited

U.S. PATENT DOCUMENTS

| 4,771,108 A | * | 9/1988 | Mackenzie ................. 525/92 F |
| 5,242,757 A | * | 9/1993 | Buisine et al. .............. 428/480 |
| 5,458,965 A | * | 10/1995 | Yoshinaka et al. .......... 428/323 |
| 5,552,512 A | * | 9/1996 | Sublett ....................... 528/308 |
| 5,753,377 A | * | 5/1998 | Takahashi et al. .......... 428/480 |

(Continued)

FOREIGN PATENT DOCUMENTS

DE    26 44 209 A1    5/1977

(Continued)

OTHER PUBLICATIONS

Schimtz, Peter et al., "Films." Ullmann's Encyclopedia of Industrial Chemistry, 5th Ed., vol. A11 (1988), pp. 85-95, 108-110.*

*Primary Examiner*—Vivian Chen
(74) *Attorney, Agent, or Firm*—ProPat, L.L.C.

(57) ABSTRACT

The invention relates to a polyester film with a thickness of from about 4 to about 23 μm, which comprises, alongside polyethylene terephthalate as main constituent, from about 2 to about 20% by weight of polyethylene naphthalate (based on the weight of the film), and has fewer than 30 pinholes per 100 m². The invention further relates to a process for producing these films, and to the use of the films in packaging composites.

14 Claims, 1 Drawing Sheet

U.S. PATENT DOCUMENTS

| | | | |
|---|---|---|---|
| 5,912,307 A * | 6/1999 | Paschke et al. | 525/444 |
| 5,948,525 A * | 9/1999 | Kimura et al. | 428/339 |
| 5,955,181 A * | 9/1999 | Peiffer et al. | 428/212 |
| 5,972,445 A * | 10/1999 | Kimura et al. | 428/35.4 |
| 6,054,212 A * | 4/2000 | Peiffer et al. | 428/336 |
| 6,149,995 A * | 11/2000 | Peiffer et al. | 428/35.8 |
| 6,261,663 B1 * | 7/2001 | Peiffer et al. | 428/141 |
| 6,383,585 B2 * | 5/2002 | Peiffer et al. | 428/35.9 |
| 6,534,169 B2 * | 3/2003 | Pfeiffer et al. | 428/336 |
| 6,537,647 B2 * | 3/2003 | Peiffer et al. | 428/141 |
| 6,946,192 B2 * | 9/2005 | Peiffer et al. | 428/339 |
| 2001/0009722 A1 | 7/2001 | Scott et al. | 428/480 |
| 2001/0035593 A1 * | 11/2001 | Peiffer et al. | 264/176.1 |
| 2001/0044009 A1 * | 11/2001 | Peiffer et al. | 428/141 |
| 2002/0015835 A1 * | 2/2002 | Peiffer et al. | 428/216 |
| 2002/0037418 A1 * | 3/2002 | Peiffer et al. | 428/458 |
| 2002/0039646 A1 * | 4/2002 | Peiffer et al. | 428/216 |
| 2003/0235701 A1 * | 12/2003 | Kliesch et al. | 428/480 |
| 2003/0235703 A1 * | 12/2003 | Kliesch et al. | 428/480 |

FOREIGN PATENT DOCUMENTS

| | | | |
|---|---|---|---|
| DE | 33 00 411 A1 | | 7/1983 |
| DE | 197 20 505 A1 | | 11/1998 |
| EP | 0 839 854 A1 | | 5/1977 |
| EP | 0 849 075 A2 | | 6/1998 |
| EP | 1 179 418 A2 | | 2/2002 |
| GB | 1 444 163 A | | 7/1976 |
| GB | 2 228 940 | * | 9/1990 |
| GB | 2 344 596 A | | 6/2000 |
| JP | 08-041184 | * | 2/1996 |
| JP | 11 227840 A1 | | 8/1999 |
| JP | 2000-052524 | * | 2/2000 |
| WO | WO 95/17303 A1 | | 6/1995 |
| WO | WO 96/35571 A1 | | 11/1996 |
| WO | WO 93/23723 A1 | | 9/1997 |
| WO | WO 93/23724 A1 | | 9/1997 |
| WO | WO 93/23725 A1 | | 9/1997 |
| WO | WO 01/96107 A2 | | 12/2001 |
| WO | WO 01/96114 A1 | | 12/2001 |

* cited by examiner

TRANSPARENT FILM MADE FROM PET AND PEN WITH UV PROTECTION, PROCESS FOR PRODUCING THE FILM, AND USE OF THE FILM IN PACKAGING WITH EXTENDED SHELF LIFE

The invention relates to a transparent film with reduced permeability to UV radiation. The film comprises terephthalic acid units and also naphthalenedicarboxylic acid units, and has no, or only a very small number of, pinholes. The invention further relates to a process for producing this film, and to its use in packaging with extended shelf life.

BACKGROUND OF THE INVENTION

Parameters important for the suitability of a film for the packaging of perishable goods are the oxygen barrier and also, in the case of transparent packaging, the permeability of the film to UV (the ultraviolet portion of light). The second item is particularly important in the case of foods, for example those presented in supermarket counters which are subject to irradiation by lamps with relatively high UV emission. If the UV permeability of the packaging here is too high the result can be unattractive discoloration and changes in taste.

A particularly important third criterion for the suitability of a packaging film is its price, since in the end-user market even relatively small price differences can shift the purchasing decision in the direction of a more favored product, even if the packaging does not meet high quality requirements with regard to shelf life.

The polyester-based packaging films currently available in the market are almost exclusively PET (polyethylene terephthalate)-based films, such as Hostaphan® RNK. Although these films are low-priced and generally have an acceptable oxygen barrier for many applications, this barrier is nevertheless often inadequate, in particular for transparent, unmetallized packaging. In addition, PET retains relatively high permeability to UV light.

Films made from PEN (polyethylene naphthalate) provide a substantially higher oxygen barrier and also have lower UV permeability, but are uneconomic due to the high price of PEN and are therefore little used in industry.

Although this problem can be reduced to some extent by using multilayer films which comprise one or more PEN layers on a PET base (e.g. DE-A-197 20 505 or WO 01/96114), these films have problems with delamination of the layers made from the different polyesters and are relatively difficult to produce. In addition, the regrind arising cannot subsequently be reused for a product of the same value, since PET and PEN become mixed during the regrinding process and can therefore no longer be utilized to produce the high-value layers comprising 100%, or almost 100% by weight, of PEN. The material can only replace the comparatively inexpensive PET in other layers or other films. For these reasons, although these films are less expensive than films composed mainly of PEN, they are considerably more expensive than standard PET packaging films and are therefore used only in niche markets with particular requirements.

Films made from blends of PET and PEN have also been described (e.g. GB 2 344 596), but there is no indication here as to how these blends can be used to produce a film with improved UV barrier and oxygen barrier, capable of being used to produce transparent packaging with increased shelf life. Nor is there any indication of the quantitative PET/PEN proportions suitable for producing films with a good oxygen barrier and a good UV barrier, and there is no indication as to how the pinhole problem may be solved.

Another very general way of improving the UV permeability of polyester films is the addition of UV stabilizers/absorbers, e.g. Tinuvin® from Ciba Specialty Chemicals (Switzerland). However, the use of these compounds is likewise associated with relatively high costs and, depending on the stabilizer used, also creates problems of suitability for direct food contact.

Prior-art films often have what are known as pinholes—holes or thin spots. These pinholes arise inter alia when large, loosely bonded particles fall out from the film, or when adjacent film layers cause damage due to large particles present in the material, or when there are particles on rollers. These pinholes markedly reduce the oxygen barrier provided by the packaging in which they are present, and can thus lead to spoilage of the goods present in the pinholed packaging. This applies in particular to the relatively long storage times intended to be achieved with the aid of a film meeting the object of the invention. Although films available in the market generally also have a low total number of pinholes, i.e. up to 30 per 100 $m^2$, depending on the size of the packaging this can nevertheless be a cause of spoilage of some percentage of the packed goods.

An object of the present invention was then to provide a film which provides a better oxygen barrier and UV barrier than straight PET films and which has no, or only a very small number of, pinholes, and which can be produced at low cost, and which is suitable for packaging applications, and which, when compared with packaging comprising PET films, ensures an improved lifetime for the packed goods, even when UV doses are relatively high.

BRIEF DESCRIPTION OF THE INVENTION

This is achieved by way of a film of thickness from 4 to 23 µm, preferably from 6 to 19 µm, and particularly preferably from 7 to 14 µm, which comprises, alongside polyethylene terephthalate, from 2 to 20% by weight, preferably from 4 to 16% by weight, and particularly preferably from 6 to 12% by weight, of polyethylene naphthalate, and has fewer than 30 pinholes per 100 $m^2$, and also by way of packaging produced therefrom.

DETAILED DESCRIPTION OF THE INVENTION

Figure 1:
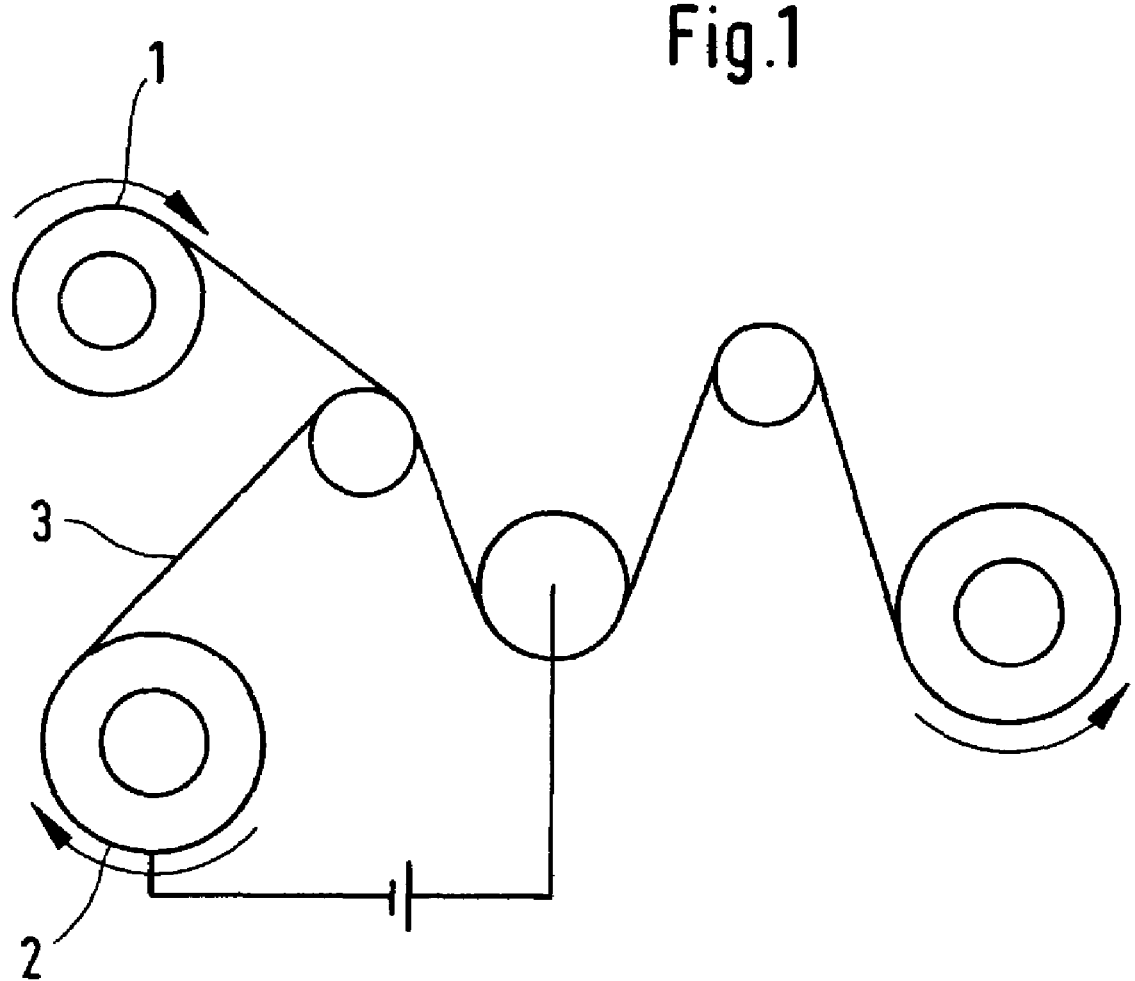
FIG. 1 is a schematic illustration of exemplary equipment used for testing pinholes.

Surprisingly, the low PEN contents of the invention are sufficient to extend markedly the lifetime of foods packed using these films—when comparison is made with packaging made from conventional PET films—either when the film is produced from mixtures of PET chips and PEN chips (block copolymers) or when random copolymers are used. The improvement achievable here depends on the amount of PEN and on the thickness of the film. For example, for a film of thickness 23 µm it is sufficient to use 8% by weight of PEN in order to prevent discoloration of the packed meat or other contents during storage for one month under the UV intensities prevailing in conventional refrigerated counters in supermarkets. From 8 to 16% by weight of PEN are needed for similarly good results in films of from 6 to 12 µm.

PEN concentrations higher than the range of the invention reduce, and finally eliminate, the tendency toward crystallization. This leads in turn to a markedly lower oxygen barrier and water-vapor barrier. For achievement of an adequate oxygen barrier of less than $100\{cm^3/(m^2 \cdot d \cdot bar)\} \cdot \{$film thickness in $\mu m/12$ $\mu m\}$ or preferably less than $97\{cm^3/(m^2 \cdot d \cdot bar)\} \cdot \{$film thickness in $\mu m/12$ $\mu m\}$ and particularly preferably less than $95\{cm^3/(m^2 \cdot d \cdot bar)\} \cdot \{$film thickness in $\mu m/12$ $\mu m\}$ it is therefore also advantageous for there to be at least one melting peak between 230 and 270° C., and preferably between 240 and 265° C., in the DSC (digital scanning calorimeter) under the conditions described under Test methods. Furthermore, the film should exhibit, alongside the melting peak, a setting peak at from 185 to 245° C.

For achievement of the barrier mentioned it is also advantageous for the PEN concentration to be at least 5% by weight.

To achieve the barrier mentioned it is also advantageous for the film to have an orientation delta p greater than 0.160, preferably greater than 0.162, and particularly preferably greater than 0.164.

Alongside the proportions mentioned of PEN, the film of the invention comprises PET, i.e. polyethylene terephthalate, as main constituent. Alongside terephthalic acid (TPA) and 2,6-naphthalenedicarboxylic acid (NDA) as monomers, the film may comprise from 0 to 5% by weight (preferably from 0.5 to 2.5% by weight) of isophthalic acid, and in this context it has surprisingly been found that from 0.5 to 2.5% by weight content of isophthalic acid (IPA) gives a further reduction of from 2 to 5% in oxygen transmission. Of course, the dimethyl esters of the dicarboxylic acids mentioned are also suitable monomers, as well as the acids themselves. The proportion of other dicarboxylic acids or dimethyl esters, e.g. 1,5-naphthalene-dicarboxylic acid, should not exceed 3% by weight, preferably 1% by weight.

The main monomer of the diol component is ethylene glycol (EG). In contrast to the positive effect mentioned of IPA, the barrier reduces with rising diethylene glycol (DEG) content. The proportion of DEG should therefore not exceed 2% by weight and is ideally from 0.5 to 1.5% by weight. The proportion of other comonomer diols, e.g. cyclohexanedimethanol, 1,3-propanediol, 1,4-butanediol, should not exceed 3% by weight, and is preferably less than 1% by weight.

Since according to the invention the film can comprise regrind materials from other applications, one preferred embodiment of the film comprises at least one optical brightener. The optical brighteners of the invention are capable of absorbing UV radiation in the wavelength range from about 360 to 380 nm and of emitting this in the form of longer-wavelength, visible blue-violet light. Suitable optical brighteners are bisbenzoxazoles, phenylcoumarins, and bisstyrylbiphenyls, in particular phenylcoumarin, particularly preferably triazine phenylcoumarin (Tinopal®, Ciba-Geigy, Basle, Switzerland). Besides the optical brightener, polyester-soluble blue dyes may also be added where appropriate. Blue dyes which have proven suitable are cobalt blue, ultramarine blue, and anthraquinone dyes, in particular Sudan Blue 2 (BASF, Ludwigshafen, Germany). The amounts used of the optical brighteners are from 10 to 50 000 ppm, in particular from 20 to 30 000 ppm, particularly preferably from 50 to 25 000 ppm, based on the weight of the layer to be modified. The amounts used of the blue dyes are from 10 to 10 000 ppm, in particular from 20 to 5 000 ppm, particularly preferably from 50 to 1 000 ppm, based on the weight of the layer to be modified.

Surprisingly, it has been found that the polyester films of the invention are substantially free from pinholes. The number of pinholes (measured as spark-overs per 100 $m^2$; see Test methods) here is <30, preferably <10, particularly preferably <5, and very particularly preferably <1. Pinholes here are holes or thin spots in the film at less than 90% of the nominal thickness. It is likely that the reduction in pinholes is attributable firstly to intrinsic factors, such as the mixing specification for the film. Alongside these intrinsic factors, however, it appears that the production process also plays a part. For example, particles adhering to nip rollers or contact rollers, or within the surfaces of the rollers, can lead to this type of damage. The result is then a large number of pinholes occurring periodically. Defects of this type can be avoided by regular cleaning of the rollers concerned. In practice it has been found here that good results can be achieved on the rollers concerned by superimposing a cleaning strip which is a "brush" composed of at least six mutually offset rows of 100 $\mu m$ of polyester monofilament bristles. This is best achieved during a roller change, but at least every 60 000 production meters. The number of pinholes rises as film thickness reduces. While films at >23 $\mu m$ remain substantially free from pinholes, these have begun to occur to the degree mentioned (about 30 per 100 $m^2$) as the thickness of the films reaches 12 $\mu m$. In the case of thin films at 8 $\mu m$, a much greater number of pinholes occurs unless the abovementioned measure is implemented.

The films of the invention have transmittance at 330 nm of less than 25%, and preferably less than 10%. At 350 nm, the films of the invention have transmittance of less than 25%, and preferably less than 10%.

The polyesters for the films of the invention may be prepared either by the transesterification process, using the usual catalysts, such as the salts of Zn, of Ca, of Li, or of Mn, or by the direct esterification process.

Where appropriate, the polyester comprises the usual additives (particles) for improving slip properties, e.g. inorganic particles, such as kaolin, talc, $SiO_2$, $MgCO_3$, $CaCO_3$, $BaCO_3$, $CaSO_4$, $BaSO_4$, $Li_3PO_4$, $Ca_3(PO_4)_2$, $Mg_3(PO_4)_2$, $TiO_2$, $Al_2O_3$, MgO, SiC, LiF, or the Ca, Ba, or Mn salts of the dicarboxylic acids used. However, it is also possible to add particles based on crosslinked, non-melting, organic polymers, e.g. polystyrenes, polyacrylates, polymethacrylates. The concentration at which the particles are preferably used is from 0.005 to 5.0% by weight, particularly preferably from 0.01 to 0.5% by weight. The average particle size is from 0.001 to 10 $\mu m$, preferably from 0.005 to 3 $\mu m$.

Commercially available particles, such as Sylobloc® (Grace, Worms, Germany) or Sylysia® (Fuji, Japan), always include a proportion of coarse grains. As described below, this can promote the occurrence of pinholes, and should therefore be minimized. This is generally the case if the raw material mixture used to produce the film gives a pressure rise of less than 10 (1 000), preferably less than 5 (500), and particularly preferably less than 3 (300), bar (kPa) after 100 minutes in what is known as the filter test (see Test methods). One way of achieving this is to keep the proportion of particles with an average particle size of from 1 to 3 $\mu m$ (e.g. Sylysia 320) smaller than 1 000 ppm, preferably smaller than 700 ppm, and particularly preferably smaller than 500 ppm, and to keep the proportion of particles with an average particle size of from 3 to 10 $\mu m$ smaller than 700 ppm, and preferably smaller than 500 ppm. The $d_{90}/d_{10}$ ratio should be smaller than 1.8, and preferably smaller than 1.7. Suitable particles here are, inter alia, Sylysia 320 and Sylysia 310 from Fuji-Sylysia, Japan.

The standard viscosity SV (DCA) of the polyesters used, measured in dichloroacetic acid to DIN 53728, is advantageously from 400 to 1 200, with preference from 700 to 900.

In one preferred embodiment, the PEN content or some of the PEN content is introduced into the film by feeding a regrind from another PEN application. This may, for example, be regrind from PEN capacitor film production (generally 100% by weight of PEN), or particularly preferably regrind from an application in which, as mentioned at the outset, one or more PEN layers are used on a PET base. It has been found that use of this type of regrind gives particularly good running reliability, since in this instance PET and PEN have been mixed in advance, thus optimizing orientability. If straight PEN regrind is used it has proven advantageous for this not to be solid-phase-condensed, as is otherwise usual prior to reuse. Besides this foreign regrind, the film also comprises up to 65% by weight of self-regrind or regrind from other PET film applications, and it has proven advantageous here for the stability of the process for the film to comprise at least 20% by weight of self-regrind, since this measure in itself provides good PET/PEN mixing.

The film of the invention may have one layer or else have more than one layer.

In the multilayer embodiment, the structure of the film has at least one base layer (B) and at least one outer layer (A) and, respectively, (C), and preference is given in particular here to a three-layer A-B-A or A-B-C structure.

For this embodiment, it is important that the ranges described above for PEN content, based on the entire film, are complied with.

At least one side of the film may also have been provided with a coating, with a copolyester, or with an adhesion promoter.

The polyester films of the invention may be produced by known processes from a polyester, where appropriate with other raw materials, and the abovementioned light-stabilizing components, and/or other conventional additives in a conventional amount of from 0.1 to not more than 10% by weight, either in the form of monofilms or else in the form of multilayer, where appropriate coextruded films with identical or different surfaces, for example with one surface comprising particles and the other surface comprising no particles. One or both surfaces of the film may also be provided with a conventional functional coating, by known processes. In another embodiment for applications with particularly high barrier requirements, the film is given a vapor-deposited coating of a metal (semi-metal) oxide layer, e.g. $Al_2O_x$ or $SiO_x$.

In the preferred extrusion process for producing the polyester film, the molten polyester material is extruded through a slot die and quenched on a chill roll in the form of a substantially amorphous prefilm. This film is then reheated and stretched longitudinally and transversely, or transversely and longitudinally, or longitudinally, transversely, and again longitudinally and/or transversely. The stretching temperatures are generally from $T_g+10°$ C. to $T_g+60°$ C. ($T_g$=glass transition temperature), and the longitudinal stretching ratio is usually from 2 to 6, in particular from 3 to 4.5, particularly preferably from 3.9 to 4.2, the transverse stretching ratio usually being from 2 to 5, in particular from 3 to 4.5, particularly preferably from 3.8 to 4.2, the ratio for any second longitudinal stretching carried out usually being from 1.1 to 3. The first longitudinal stretching may, where appropriate, be carried out simultaneously with the transverse stretching (simultaneous stretching). The heat-setting of the film then takes place at oven temperatures of from 180 to 260° C., in particular from 220 to 250° C. The film is then cooled and wound.

The film composite finally used for packaging purposes comprises, besides the film of the invention, depending on the use, other films, for example films made from PET or made from an oriented polyamide (oPA), or PE sealable films or PP sealable films. The film or the composite may also have been coated with a sealable layer, for example of polypropylene (PP) or polyethylene (PE), to control sealing properties. Preferred methods for combining the individual films to give a film composite use laminating adhesives, e.g. those based on polyurethane.

The packaging finally used is therefore composed either of the composite sealed to itself (bag packaging) or of the composite applied as "lid" to a substrate (tray). In the case of the second possibility, it is to be noted that the tray, if it is transparent, should also have low UV permeability, achievable by using the film of the invention applied by lamination, for example. Transparent laminates or composites are described by way of example in DE-A-33 00 411 and DE-A-26 44 209.

The total thickness of the inventive composite film, which is composed at least of the inventive film I and of a film II, may vary within wide limits and depends on the application. The inventive composite films preferably have a thickness in the range from 9 to 1 200 µm, in particular from 10 to 1 000 µm, particularly preferably from 20 to 800 µm.

The film II of the inventive composite film may be a thermoplastic film and/or a standard thermoplastic film, and/or a polyolefin film, and/or the inventive film I. This second film is preferably applied to that side of the film I which has additional functionality ($SiO_x$ coating, corona treatment, and/or flame treatment, and/or adhesion promoter, and/or copolyester, and/or $Al_2O_x$ coating, and/or printing inks, to mention just a few functionalities), but may also be applied to that side of the film which has no functionality.

The film II may have one or more layers and, like film I, may have been oriented by stretching, and may have at least one sealable layer. The second film may have been bonded to film I of the invention with or without adhesive.

The thickness of this film II is generally from 4 to 700 µm.

The composite films are generally obtained by laminating at least the films I and II employed to one another with or without an adhesive layer therebetween, by passing these between rolls temperature-controlled to from 30 to 90° C.

However, it is also possible, for example, to apply the film II to the previously produced film I by in-line coating (melt extrusion).

When adhesives are used, these are applied to one surface of the film I and/or of the film II, using known methods, in particular by application from solutions or dispersions in water or in organic solvents. These solutions usually have an adhesive concentration of from 5.0 to 40.0% by weight, in order to give an amount of from 1.0 to 10.0 g/m² of adhesive on the film I and/or II.

Adhesives which have proven particularly advantageous are those composed of thermoplastic resins, such as cellulose esters and cellulose ethers, of alkyl esters and acrylic esters, of polyimides, of polyurethanes, or of polyesters, or of hot-curing resins, such as epoxy resins, urea-formaldehyde resins, phenol-formaldehyde resins, or melamin/formaldehyde resins, or of synthetic rubbers.

Examples of suitable solvents for the adhesive are hydrocarbons, such as ligroin and toluene, esters, such as ethyl acetate, or ketones, such as acetone and methyl ethyl ketone.

It was particularly surprising that despite the low PEN contents of the invention, even composites with thin PET/PEN copolymer films (e.g. 12 μm) protect the contents so effectively from spoiling under UV light that shelf life extensions of more than 100% are possible even without the use of additional UV absorbers.

The invention is further illustrated below using examples.

The following standards or methods were used here for measuring each of the properties.

Test Methods

Light Transmittance

Light transmittance (here UV transmittance) is the ratio of total transmitted light to the quantity of incident light.

It is measured using "Hazegard plus" equipment to ASTM D 1003.

SV (DCA), IV (DCA)

Standard viscosity SV (DCA) is determined at 25° C. in dichloroacetic acid by a method based on DIN 53726. Intrinsic viscosity (IV) is calculated as follows from standard viscosity:

$$IV=[\eta]=6.907 \cdot 10^{-4} SV(DCA)+0.063096 [dl/g]$$

Yellowness Index

Yellowness Index YI is the deviation from the colorless condition in the "yellow" direction and is measured to DIN 6167. Yellowness Index YI values of <5 are not visible.

Pinholes

The film to be tested (1) [see FIG. 1], width 50 cm, is drawn over a metal roller together with a metallized film (2) (5 mm narrower than the film to be tested). A voltage of 250 V/μm (based on the thickness of the film to be tested; 12 μm film=3000 V) is applied between the metallized film (2) and the metal roller. The film to be tested (1) is in contact here with the metal roller, and the metallized side (3) of the metallized film is in contact with the film to be tested (1).

The take-off speed is 4 m/min. At least 100 m² are tested (and the width of the film to be tested here can be from 20 cm to 1.2 m). The number of spark-overs between test film and metal roll is counted and stated in spark-overs per 100 m².

Filter Test

The polymer pellets or the mixture of pellets is dried at 150° C. for 20 min in a commercially available fluidized-bed drier. The pellets are melted in a commercially available extruder and filtered at 295° C. through a non-woven fiber filter of nominal width 10 μm from Seebach (Germany). The pressure upstream of the filter is measured using a pressure sensor (Tronic Line 0-350 bar pressure detector from Wika, Germany), and is indicated. The relevant filter test value for 100 min is calculated by subtracting the pressure after 15 min from the pressure after 100 min.

Planar Orientation Delta p

Planar orientation is determined by using the following method to measure refractive indices with an Abbe refractometer:

| | |
|---|---|
| Specimen size and length: | from 60 to 100 mm |
| Specimen width: | corresponds to prism width of 10 mm |

To determine $n_{MD}$ and $n_z$, the specimen to be tested has to be cut out from the film with the running edge of the specimen running precisely in the direction TD. To determine $n_{TD}$ and $n_z$, the specimen to be tested has to be cut out from the film with the running edge of the specimen running precisely in the direction MD. The specimens are to be taken from the middle of the film web. Care must be taken that the temperature of the Abbe refractometer is 23° C. Using a glass rod, a little diiodomethane (N=1.745) or diiodomethane-bromonaphthalene mixture is applied to the lower prism, which has been cleaned thoroughly before the test. The refractive index of the mixture must be greater than 1.685. The specimen cut out in the direction TD is firstly laid on top of this, in such a way that the entire surface of the prism is covered. Using a paper wipe, the film is now firmly pressed flat onto the prism, so that it is firmly and smoothly positioned thereon. The excess liquid must be sucked away. A little of the test liquid is then dropped onto the film. The second prism is swung down and into place and pressed firmly into contact. The right-hand knurled screw is then used to turn the indicator scale until a transition from light to dark can be seen in the field of view in the range from 1.62 to 1.68. If the transition from light to dark is not sharp, the colors are brought together using the upper knurled screw in such a way that only one light and one dark zone are visible. The sharp transition line is brought to the crossing point of the two diagonal lines (in the eyepiece) using the lower knurled screw. The value now indicated on the measurement scale is read off and entered into the test record. This is the refractive index $n_{MD}$ in the machine direction. The scale is now turned using the lower knurled screw until the range visible in the eyepiece is from 1.49 to 1.50.

The refractive index $n_z$ (in the direction of the thickness of the film) is then determined. To improve the visibility of the transition, which is only weakly visible, a polarization film is placed over the eyepiece. This is turned until the transition is clearly visible. The same considerations apply as in the determination of $n_{MD}$. If the transition from light to dark is not sharp (colored), the colors are brought together using the upper knurled screw in such a way that a sharp transition can be seen. This sharp transition line is placed on the crossing point of the two diagonal lines using the lower knurled screw, and the value indicated on the scale is read off and entered into the table.

The specimen is then turned, and the corresponding refractive indices $n_{MD}$ and $n_z$ of the other side are measured and entered into an appropriate table.

After determining the refractive indices in, respectively, the direction MD and the direction of the thickness of the film, the specimen strip cut out in the direction MD is placed in position and the refractive indices $n_{TD}$ and $n_z$ are determined accordingly. The strip is turned over, and the values for the B side are measured. The values for the A side and the B side are combined to give average refractive indices. The orientation values are then calculated from the refractive indices using the following formulae:

$$\text{delta } n = n_{MD} - n_{TD}$$

$$\text{delta } p = (n_{MD} + n_{TD})/2 - n_z$$

$$n_{av} = (n_{MD} + n_{TD} + n_z)/3$$

Glass Transition Temperature

The glass transition temperature $T_g$ was determined on film specimens with the aid of DSC (differential scanning calorimetry) (DIN 73 765). A DSC 1090 from DuPont was used. The heating rate was 20 kg/min and the specimen weight was about 12 mg. The glass transition $T_g$ was determined in the first heating procedure. Many of the specimens exhibited an enthalpy relaxation (a peak) at the start of the stepped glass transition. The temperature taken as $T_g$ was that at which—irrespective of the peak-shaped enthalpy relaxation—the stepped change in heat capacity reached half of its height in the first heating procedure. In all instances, only a single glass transition was observed in the thermogram during the first heating procedure.

Melting Peak

The glass transition temperature $T_g$ was determined on film specimens with the aid of DSC (differential scanning calorimetry) (DIN 73 765). A DSC 1090 from DuPont was used. The heating rate was 20 K/min and the specimen weight was about 12 mg. The melting peak was determined in the first heating procedure. The maximum of the largest endothermic peak at from 180 to 280° C. was evaluated here as the melting peak.

Film Setting Peak

The film setting peak was determined by means of DSC analysis using equipment from DuPont. An endothermic peak occurs prior to the melting peak in a temperature region between 180 and 250° C. during the first heating at a heating rate of 60 K/min.

Oxygen Barrier

The oxygen barrier was measured using a Mocon Modern Controls (USA) OX-TRAN 2/20 as in DIN 53 380, Part 3.

Shelf Life 200 g of boiled ham, in slices of diameter 10 cm and thickness 2.5 mm, were placed in the composite packaging using the inventive film, and the packaging was then sealed. A second composite packaging of the same type but using a commercially available PET film of the same thickness (in this case RNK from Mitsubishi Polyester Film Europe GmbH) is filled in the same way. Three packs of the UV-protected inventive composite and three packs using the commercially available PET film are then placed in an open chest refrigerator whose temperature is +3° C. 1 m above the packs (side with inventive film upward) there are 5 commercially available Philips TL 20W/05 neon tubes. The packs are (visually) checked daily for visible discoloration. The time to appearance of discoloration is noted, and the average (in hours) for the packs made from commercially available PET film is set at 100%. The percentage difference from this value is calculated for the inventive packs, the method being to divide the average (in hours) for occurrence of discoloration on these packs by the average of the packs made from commercially available PET film, the result being multiplied by 100. 100 is subtracted from the result.

Each of the examples and comparative examples below uses a single-layer transparent film of varying thickness.

Film Production

Thermoplapstic chips were mixed in the ratios given in the examples, and precrystallized at 155° C. for 1 min in a fluidized-bed drier, and then dried at 150° C. for 3 h in a tower drier, and extruded at 290° C. The molten polymer was drawn off from a die by way of a take-off roller. The film was stretched by a factor of 4.0 in the machine direction at 116° C., and transverse stretching by a factor of 3.9 was carried out in a frame at 110° C. The film was then heat-set at 225° C. and transversely relaxed by 2% at temperatures of from 200 to 180° C. The nip rollers and contact rollers are cleaned with the brush described (6 mutually offset rows of 100 µm of polyester monofilament bristles) every 30 000 m.

Composite Production

From each of the films of the examples, three different composites were manufactured. For measurement of shelf life, the composite is sealed to a commercially available APET tray as substrate (on the side facing away from the UV light).

Composite A

Composite Film Using PE

The film from the example is coated with an adhesive (Adcote® 700 A+C from Rohm & Haas, Germany) in such a way that the weight of the adhesive layer formed is 0.5 g/m². A film of thickness 40 µm made from low-density polyethylene (Buklino® 40 µm from B&K, Germany) is then laminated onto the film of the example coated with adhesive (anchoring agent).

Composite B

Composite Film Using PP

The film from the example is coated with an adhesive (Adcote® 700 A+C from Rohm & Haas, Germany) in such a way that the weight of the adhesive layer formed is 0.5 g/m². A sealable film of thickness 30 µm made from polypropylene (GND 30 from Trespaphan, Germany) is then laminated onto the film of the example coated with adhesive (anchoring agent).

Composite C

Composite Film Using PET

The film from the example is coated with an adhesive (Adcote® 700 A+C from Rohm & Haas, Germany) in such a way that the weight of the adhesive layer formed is 0.5 g/m². A biaxially oriented sealable film of thickness 20 µm made from PET (Hostaphan RHS 20 from Mitsubishi Polyester Film GmbH) is then laminated onto the film of the example coated with adhesive (anchoring agent).

EXAMPLES

Commercially available packaging films from Mitsubishi Polyester Film GmbH (Germany) served as comparison for shelf life improvement: specifically RNK12, RNK23, and RN8.

Example 1

A transparent film of thickness 23 µm is produced.

Raw materials:

| | | |
|---|---|---|
| R1: | RT49 PET (KoSa, Offenbach, Germany), SV = 800 | 46% by weight |
| R2: | PET/PEN film regrind with 10% by weight PEN content, SV = 700, IPA content = 4% by weight, comprising 500 ppm of Sylysia 320 and 500 ppm of Aerosil TT600 (Degussa) | 50% by weight |
| R3: | PET, SV = 800, comprising 10 000 ppm of Sylysia 320 and 15 000 ppm of Aerosil TT600 (Degussa, Germany) | 4% by weight |

Oxygen Barrier=$50\{cm^3/(m^2 \cdot d \cdot bar)\} \cdot \{23\ \mu m/12\ \mu m\}$ Shelf life rise in % compared with a similar composite using RNK 23 film (Mitsubishi Polyester Film GmbH, Wiesbaden, Germany):

| | |
|---|---|
| Composite A: | 50% |
| Composite B: | 55% |
| Composite C: | 35% |

Example 2

A transparent film of thickness 12 μm is produced.

Raw materials (% by weight data based on the 60% by weight content of virgin raw material; the film comprises 40% by weight of self-regrind):

| | | |
|---|---|---|
| R1: | RT49 PET, SV = 800 | 85% by weight |
| R3: | PET from KoSa, SV = 800, comprising 10 000 ppm of Sylysia 320 and 15 000 ppm of Aerosil TT600 (Degussa, Germany), and 0.2% by weight of anthraquinone dye (Sudan Blue 2, BASF, Ludwigshafen, Germany) | 5% by weight |
| R4: | 100% by weight of PEN (KoSa, Offenbach, Germany), SV = 650 | 10% by weight |

Oxygen Barrier=93{cm$^3$/(m$^2$·d·bar)}·{12 μm/12 μm}

Shelf life rise in % compared with a similar composite using RNK 12 film (Mitsubishi Polyester Film GmbH, Wiesbaden, Germany):

| | |
|---|---|
| Composite A: | 102% |
| Composite B: | 98% |
| Composite C: | 60% |
| Yellowness Index = 1 | |

Example 3

A transparent film of thickness 8 μm is produced.

Raw materials (% by weight data based on the 60% by weight content of virgin raw material; the film comprises 40% by weight of self-regrind):

| | | |
|---|---|---|
| R1: | RT49 PET, SV = 800 | 80% by weight |
| R3: | PET, SV = 800, comprising 10 000 ppm of Sylysia 320 and 15 000 ppm of Aerosil TT600 (Degussa, Germany) | 6% by weight |
| R4: | 100% by weight of PEN (KoSa), SV = 650 | 14% by weight |

Oxygen Barrier=137{cm$^3$/(m$^2$·d·bar)}·{8 μm/12 μm}

Shelf life rise in % compared with a similar composite using RN 8 film (Mitsubishi Polyester Film GmbH, Wiesbaden, Germany):

| | |
|---|---|
| Composite A: | 114% |
| Composite B: | 99% |
| Composite C: | 75% |

Comparative Example 1

As Example 3, but the roller cleaning was omitted, and 6% by weight of a PET with an SV of 800 and 7 000 ppm of Sylobloc® CP4-8191 ($d_{50}$=7 μm) from Grace (Worms, Germany) and 15 000 ppm of Aerosil were used instead of 6% by weight of R3.

Oxygen Barrier=138{cm$^3$/(m$^2$·d·bar)}·{8 μm/12 μm}

Shelf life rise in % compared with a similar composite using RN 8 film (Mitsubishi Polyester Film GmbH, Wiesbaden, Germany):

| | |
|---|---|
| Composite A: | 116% |
| Composite B: | 10% |
| Composite C: | 70% |

Checks on the packaging using composite B showed that the small improvement over the standard was attributable to a number of small discolored spots caused by pinholes in the film of thickness 8 μm.

The invention claimed is:

1. A biaxially oriented film with a thickness of from about 4 to about 23 μm, said film polymer consisting of polyester, which comprises, alongside polyethylene terephthalate as main constituent, from about 8 to about 20% by weight of polyethylene naphthalate (based on the weight of the film) and particles, and has fewer than 10 pinholes per 100 m$^2$, wherein said film has an oxygen barrier value smaller than 100 {cm$^3$/(m$^2$·d·bar)}·{film thickness in μm/12 μm} in the absence of an additional barrier layer.

2. The polyester film as claimed in claim 1, which has a melting peak at from about 230 to about 270° C.

3. The polyester film as claimed in claim 1, which has a polyethylene terephthalate content of at least 5% by weight (based on the weight of the film).

4. The polyester film as claimed in claim 1, which has a planar orientation delta p greater than 0.160.

5. The polyester film as claimed in claim 1, which has a transmittance of <25% at 330 and 350 nm.

6. The polyester film as claimed in claim 1, wherein the film contains from 0.005 to 5.0% by weight particles and wherein the proportion in the film of particles with an avenge particle size of from about 1 to about 3 μm is smaller than 1 000 ppm, and the proportion of particles with an avenge particle size of from about 3 to about 10 μm is smaller than 700 ppm.

7. A process for producing a polyester film as claimed in claim 1, which comprises melting polyester material which comprises from about 2 to about 20% by weight of polyethylene naphthalate alongside the main constituent polyethylene terephthalate, extruding the material through a slot die, quenching the material in the form of a prefilm on a chill roll, then reheating the material and stretching it longitudinally and transversely, or transversely and longitudinally, or longitudinally, transversely, and again longitudinally and/or transversely, and then heat-setting, cooling, and winding the material.

8. The process as claimed in claim 7, wherein during production of the film it comes into contact wit one or more pre-cleaned rollers.

9. A packaging composite made from a film as claimed in claim 1 and from another film.

10. A film according to claim 1, wherein said film has a thickness of about 23 μm and includes about 8% by weight of polyethylene naphthalate (based on the weight of the film) or said film has a thickness of from about 6 to about 12 μm and includes from about 8 to about 16% by weight of polyethylene naphthalate (based on the weight of the film), said film preventing the discoloration of packed meat or other contents during storage under the UV intensities prevailing in conventional refrigerated counters.

11. A film according to claim 1, wherein said film is formed from polymer consisting of polyethylene terephthalate and polyethylene naphthalate or copolymers thereof.

12. A film according to claim 1, wherein said film comprises diethylene glycol in amounts of 0.5 to less than 2% by weight.

13. A polyester film with a thickness of from about 4 to about 23 μm, which comprises, alongside polyethylene terephthalate as main constituent, from about 2 to about 20% by weight of polyethylene naphthalate (based on the weight of the film), and particles and has fewer than 10 pinholes per 100 m$^2$, wherein said film has an isophthalic acid content of from 0.5 to about 2.5% by weight (based on the weight of the film) wherein said film has an oxygen barrier value smaller than 97 $\{cm^3/(m^2 \cdot d \cdot bar)\} \cdot \{$film thickness in μm/12 μm$\}$ in the absence of an additional barrier layer.

14. A packaging composite made from (i) a polyester film with a thickness of from about 4 to about 23 μm, which comprises, alongside polyethylene terephthalate as main constituent, from about 2 to about 20% by weight of polyethylene naphthalate (based on the weight of the film), and has fewer than 10 pinholes per 100 m$^2$ and (ii) another film, wherein the other film is polyester film, polyamide film, polyethylene film, or polypropylene film, wherein said film has an oxygen barrier value smaller than 100 $\{cm^3/(m^2 \cdot d \cdot bar)\} \cdot \{$film thickness in μm/12 μm$\}$ in the absence of an additional barrier layer.

* * * * *